US007840307B2

(12) United States Patent
Mauger et al.

(10) Patent No.: US 7,840,307 B2
(45) Date of Patent: Nov. 23, 2010

(54) OBJECT DISPENSER WITH LOCKING FILL DOOR USEFUL IN SYSTEM AND METHOD FOR DISPENSING OBJECTS

(75) Inventors: Jennifer Ann Mauger, Durham, NC (US); Rafael Agostini, III, Carey, NC (US); Richard D. Michelli, Raleigh, NC (US)

(73) Assignee: Parata Systems, L.L.C., Durham, NC (US)

( * ) Notice: Subject to any disclaimer, the term of this patent is extended or adjusted under 35 U.S.C. 154(b) by 44 days.

(21) Appl. No.: 11/760,016

(22) Filed: Jun. 8, 2007

(65) Prior Publication Data

US 2008/0288105 A1 Nov. 20, 2008

Related U.S. Application Data

(60) Provisional application No. 60/938,885, filed on May 18, 2007.

(51) Int. Cl.
*G06F 17/00* (2006.01)

(52) U.S. Cl. ....................... 700/237; 700/241; 700/232; 700/231; 700/242

(58) Field of Classification Search ......... 700/231-244; 221/1-312 C
See application file for complete search history.

(56) References Cited

U.S. PATENT DOCUMENTS 5,713,487 A * 2/1998 Coughlin ....................... 221/2
5,720,154 A * 2/1998 Lasher et al. ................. 53/411
5,852,911 A 12/1998 Yuyama et al.
5,905,653 A * 5/1999 Higham et al. .............. 700/244
5,912,818 A * 6/1999 McGrady et al. ............ 700/232

(Continued)

FOREIGN PATENT DOCUMENTS

WO WO 99/30248 6/1999

OTHER PUBLICATIONS

International Search Report and Written Opinion for PCT/US2008/005296 mailed July 7, 2008.

*Primary Examiner*—Gene Crawford
*Assistant Examiner*—Michael K Collins
(74) *Attorney, Agent, or Firm*—Myers Bigel Sibley & Sajovec

(57) ABSTRACT

A dispenser for dispensing prescription pharmaceuticals contained therein includes: a bin, the bin including an access opening; a door adjacent to the opening and movable between open and closed positions to allow access for filling the bin through the opening, wherein one of the bin and the door includes a first identifier corresponding to the identity of units of a single prescription pharmaceutical contained in the bin; a locking assembly configured and positioned to engage the door in the closed position and prevent the door from moving to the open position; an identifier reading device operably associated with the locking assembly to scan the first identifier and a second identifier on a bulk container, the second identifier corresponding to the identity of the contents of the bulk container; and a controller having a data storage unit and configured to receive and compare signals from the identifier reading device corresponding to the first and second identifiers. The controller is operably associated with the locking assembly such that the locking assembly disengages from the door responsive to a positive comparison by the controller, thereby enabling the door to be moved to the open position.

22 Claims, 14 Drawing Sheets

U.S. PATENT DOCUMENTS

| | | | | |
|---|---|---|---|---|
| 6,155,485 | A | 12/2000 | Coughlin et al. | |
| 6,202,923 | B1 * | 3/2001 | Boyer et al. | 235/375 |
| 6,219,587 | B1 * | 4/2001 | Ahlin et al. | 700/233 |
| 6,604,019 | B2 * | 8/2003 | Ahlin et al. | 700/231 |
| 6,694,217 | B2 * | 2/2004 | Bloom | 700/215 |
| 6,971,541 | B2 | 12/2005 | Williams et al. | |
| 7,014,063 | B2 * | 3/2006 | Shows et al. | 221/211 |
| 7,040,504 | B2 * | 5/2006 | Broadfield et al. | 221/98 |
| 7,175,081 | B2 * | 2/2007 | Andreasson et al. | 235/385 |
| 7,263,411 | B2 | 8/2007 | Shows et al. | |
| 7,286,900 | B1 * | 10/2007 | Frederick et al. | 700/242 |
| RE40,453 | E * | 8/2008 | Lasher et al. | 53/411 |
| 7,518,516 | B2 * | 4/2009 | Azevedo et al. | 340/572.1 |
| 7,653,457 | B2 * | 1/2010 | Bloom | 700/226 |
| 2004/0133705 | A1 * | 7/2004 | Broussard et al. | 710/1 |
| 2006/0157492 | A1 * | 7/2006 | Shows et al. | 221/9 |
| 2006/0265102 | A1 * | 11/2006 | Bain | 700/237 |

* cited by examiner

OBJECT DISPENSER WITH LOCKING FILL DOOR USEFUL IN SYSTEM AND METHOD FOR DISPENSING OBJECTS

RELATED APPLICATION

This application claims priority from U.S. Provisional Patent Application No. 60/938,885, filed May 18, 2007 and entitled OBJECT DISPENSER WITH LOCKING FILL DOOR USEFUL IN SYSTEM AND METHOD FOR DISPENSING OBJECTS, the disclosure of which is hereby incorporated herein in its entirety.

FIELD OF THE INVENTION

The present invention is directed generally to the dispensing of prescriptions of pharmaceuticals, and more specifically is directed to the automated dispensing of pharmaceuticals.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. (hereinafter Williams '541). This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. For example, in automated systems for dispensing pharmaceuticals, ensuring that the correct contents are used to fill the dispensers can be extremely important. When the system of dispensing pharmaceuticals is automated, initially filling the dispensers with the wrong contents can easily result in the wrong contents being dispensed.

SUMMARY OF THE INVENTION

As a first aspect, embodiments of the present invention are directed to a dispenser for dispensing prescription pharmaceuticals contained therein. The dispenser comprises: a bin, the bin including an access opening; a door adjacent to the opening and movable between open and closed positions to allow access for filling the bin through the opening, wherein one of the bin and the door includes a first identifier corresponding to the identity of units of a single prescription pharmaceutical contained in the bin; a locking assembly configured and positioned to engage the door in the closed position and prevent the door from moving to the open position; an identifier reading device operably associated with the locking assembly to scan the first identifier and a second identifier on a bulk container, the second identifier corresponding to the identity of the contents of the bulk container; and a controller having a data storage unit and configured to receive and compare signals from the identifier reading device corresponding to the first and second identifiers. The controller is operably associated with the locking assembly such that the locking assembly disengages from the door responsive to a positive comparison by the controller, thereby enabling the door to be moved to the open position.

As a second aspect, embodiments of the present invention are directed to a method for opening a bin containing units of a prescription pharmaceutical. The method comprises: reading a first identifier that corresponds with the identity of the prescription pharmaceutical contained in the bin; reading a second identifier that corresponds with the identity of a prescription pharmaceutical contained in a bulk container; comparing the first and second identifiers to confirm a positive comparison therebetween; and unlocking a locked door to the bin to permit access to the bin responsive to the positive comparison.

As a third aspect, embodiments of the present invention are directed to a dispenser for dispensing objects contained therein. The dispenser comprises: a hollow bin, the hollow bin including an opening; a door adjacent to the opening of the bin; a first identifier attached to one of the hollow bin and the door; a locking assembly attached to at least one of the hollow bin and the door, the locking assembly having an actuating member comprising a shape memory alloy and an extendable member connected with the actuating member; a reading device; and a controller associated with the locking assembly and the reading device. Responsive to a signal from the controller, the locking assembly moves from a locked position to an unlocked position such that the door can be moved away from the opening of the bin that provides access thereto.

DETAILED DESCRIPTION OF EMBODIMENTS OF THE INVENTION

Figure 1:
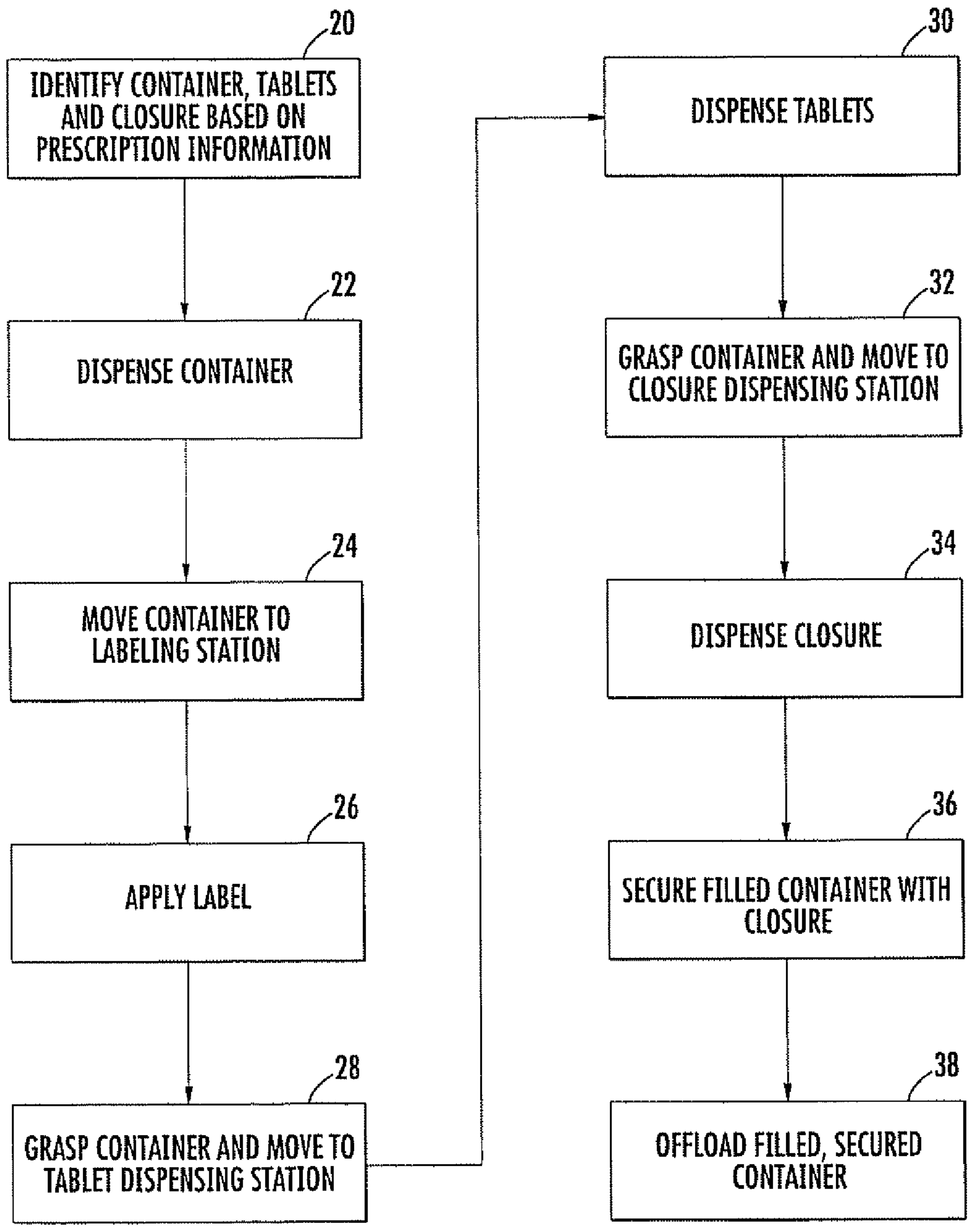
FIG. 1 is a flow chart illustrating an embodiment of a method for dispensing pharmaceuticals according to the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As described above, the invention relates generally to a system and process for dispensing pharmaceuticals. An exemplary process is described generally with reference to FIG. 1. The process begins with the identification of the proper container, tablets or capsules and closure to be dispensed based on a patient's prescription information (Box 20). A container of the proper size is dispensed at a container dispensing station (Box 22), then conveyed to a labeling station (Box 24). The labeling station applies a label (Box 26), after which the container is transferred to a tablet dispensing station (Box 28), from which the designated tablets are dispensed in the designated amount into the container (Box 30). The filled container is then grasped again and moved to a closure dispensing station (Box 32), where a closure of the proper size has been dispensed (Box 34). The filled container is secured with a closure (Box 36), then transported to an offload station and offloaded (Box 38).

Figure 2:
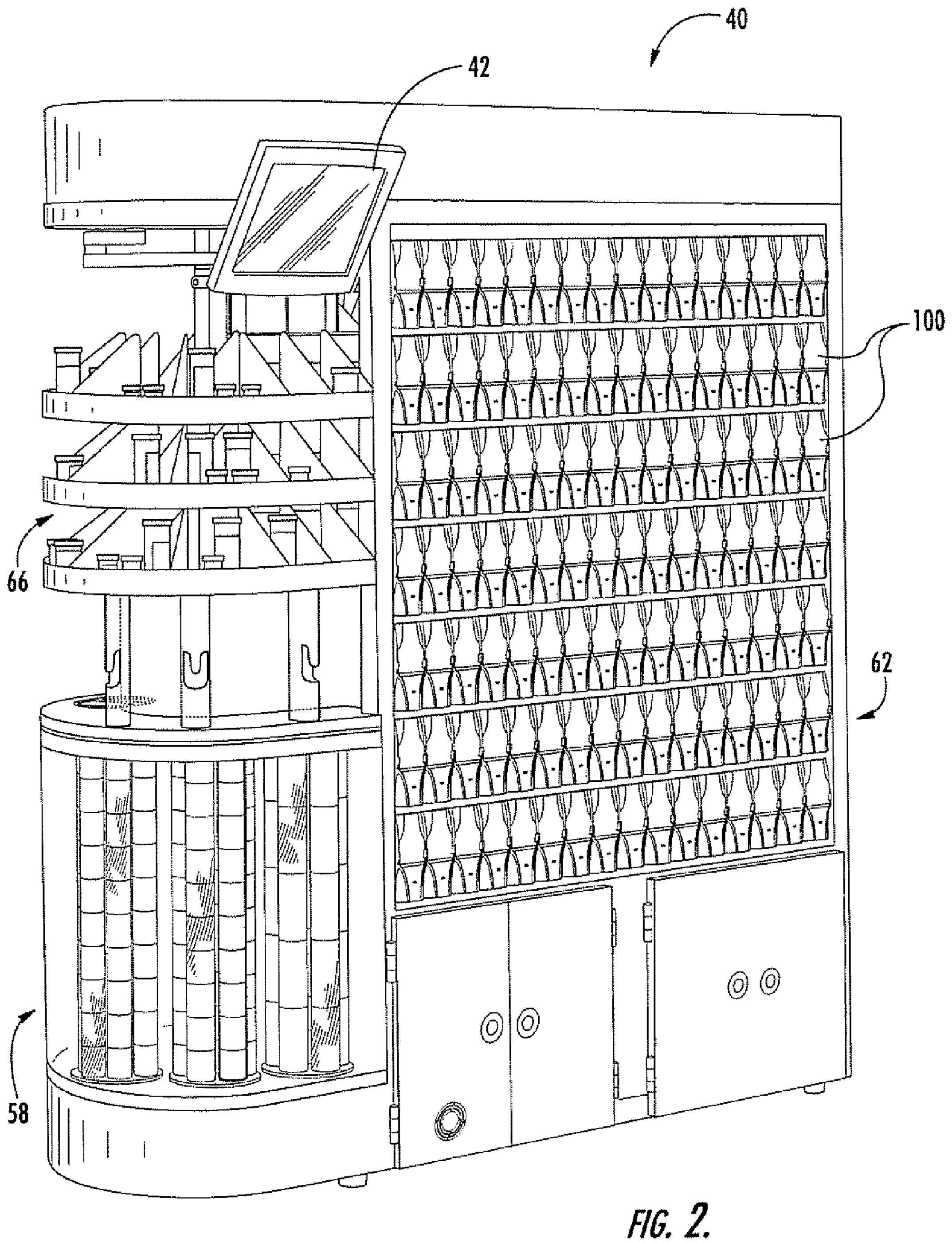
FIG. 2 is a perspective view of a pharmaceutical tablet dispensing system according to the present invention.
Figure 3:
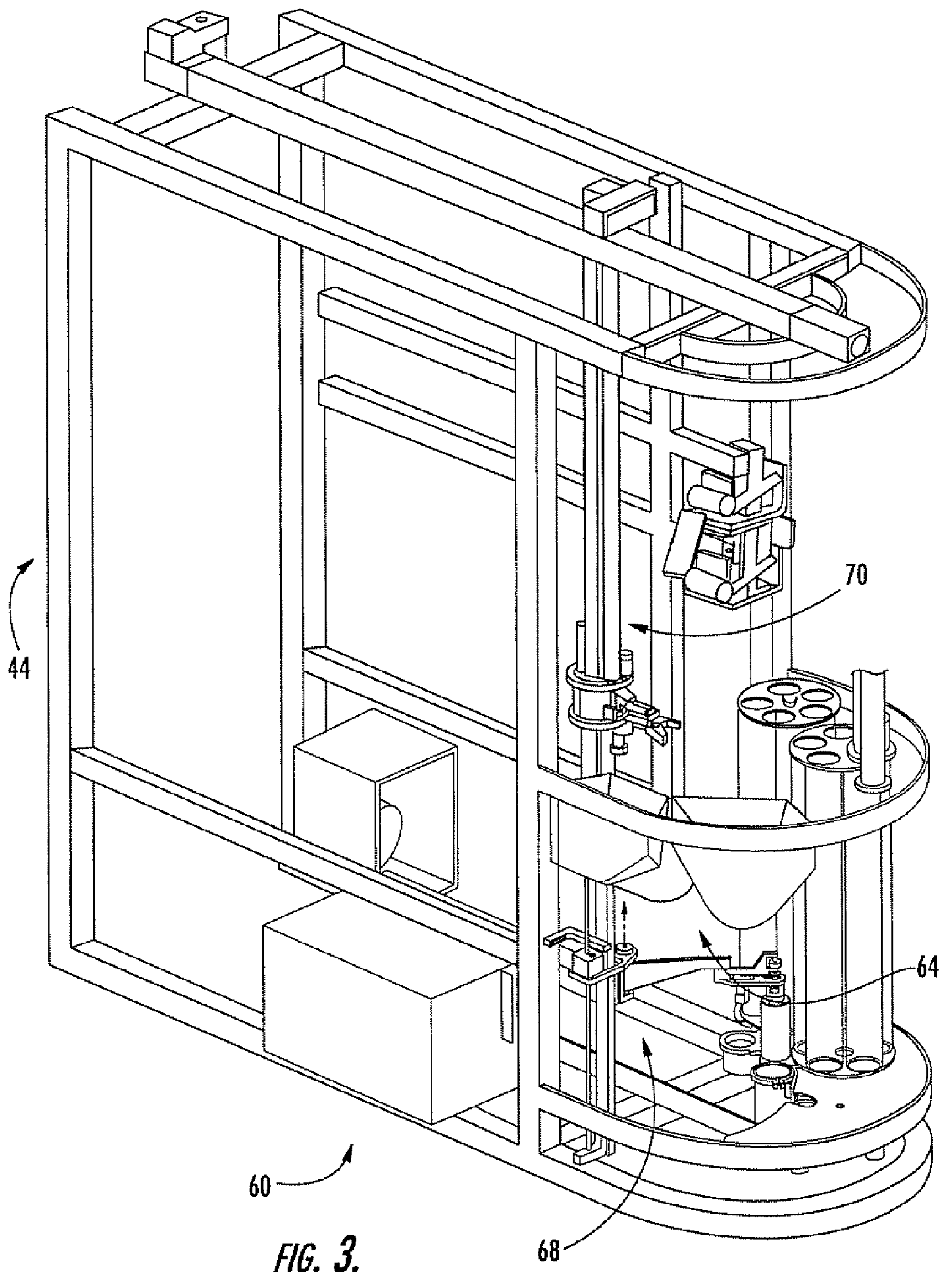
FIG. 3 is a cutaway view of the system of FIG. 2 illustrating the support frame: the container dispensing station, the labeling carrier, the dispensing carrier, and the closure dispensing station.

A system that can carry out this process is illustrated in FIGS. 2 and 3 and designated broadly therein at 40. The system 40 includes a support frame 44 for the mounting of its various components. The system 40 generally includes as operative stations a controller (illustrated herein by the graphical user interface 42), a container dispensing station 58, a labeling station 60, a tablet dispensing station 62, a closure station 64, and an offloading station 66. In the illustrated embodiment, containers, tablets and closures are moved between these stations with two different conveying devices: a labeling carrier 68 and a dispensing carrier 70; however, in some embodiments only a single carrier may be employed, or one or more additional carriers may be employed. Descriptions of exemplary operative stations and conveying devices are described in detail in U.S. Pat. No. 6,971,541 to Williams et al. and U.S. patent application Ser. No. 11/111,270; filed Apr. 21, 2005; Ser. No. 11/738,664, filed Apr. 23, 2007; Ser. No. 11/679,850, filed Feb. 28, 2007; Ser. No. 11/599,526, filed Nov. 14, 2006; Ser. No. 11/599,576, filed Nov. 14, 2006; and Ser. No. 11/693,929, filed Mar. 30, 2007, the disclosures of which are hereby incorporated herein in their entireties.

Figure 4:
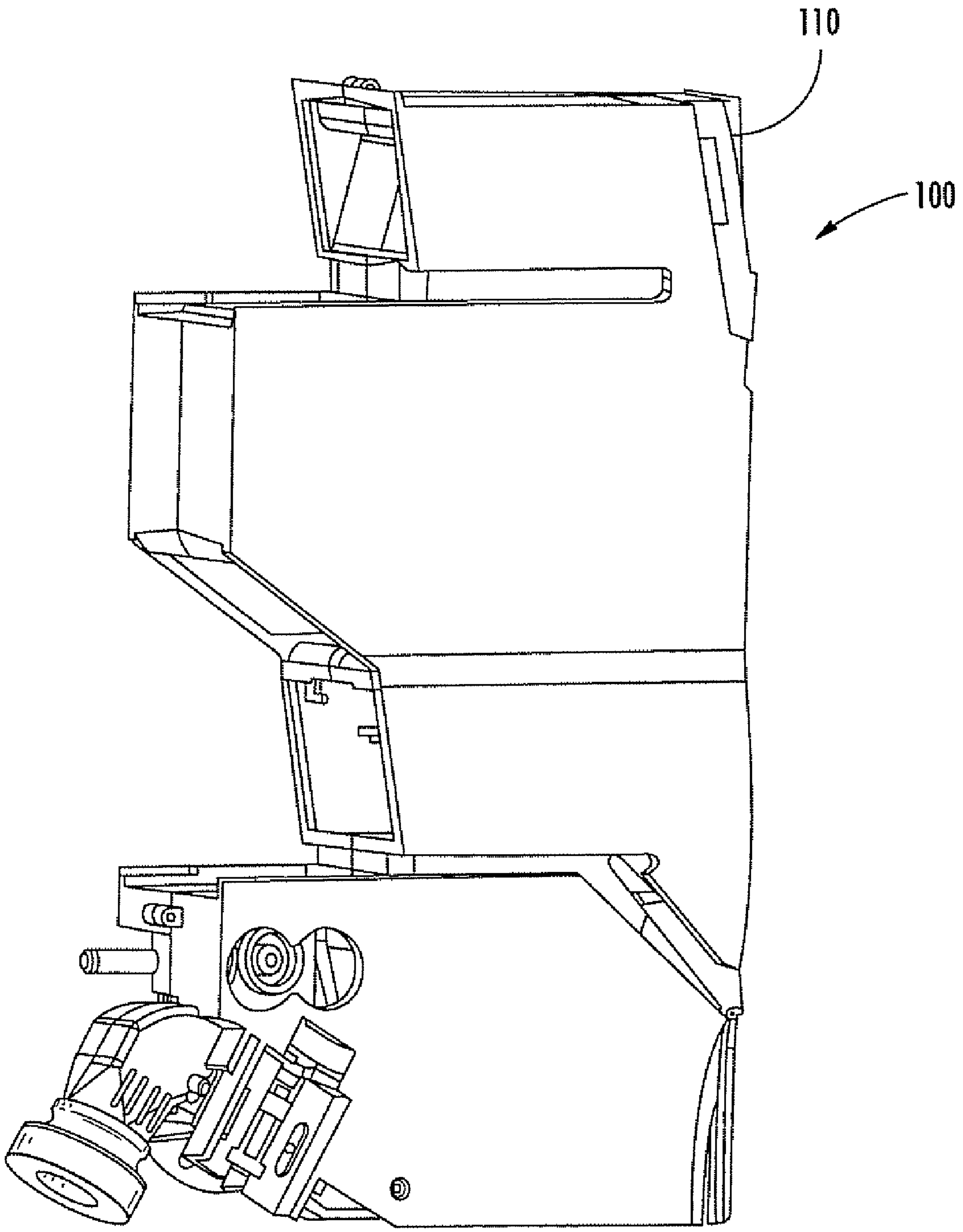
FIG. 4 is a perspective view of a dispensing bin according to the present invention.

Referring now to FIG. 4, an embodiment of a tablet dispenser, designated broadly at 100, is illustrated therein. The dispenser 100 is exemplary of dispensers employed in the tablet dispensing station 62 to dispense tablets. As illustrated, the dispenser 100 may include an upper half and a lower half with a door 110 mounted onto the upper rear portion of the upper half. Thus, tablets can be supplied through the door 110 to an upper chamber; they remain there until they are fed via gravity down the floor to the passage and into a lower chamber. The configuration and basic operation of the dispenser 100 is described in detail in co-pending and co-assigned U.S. patent application Ser. No. 11/111,270, supra.

Figure 5:
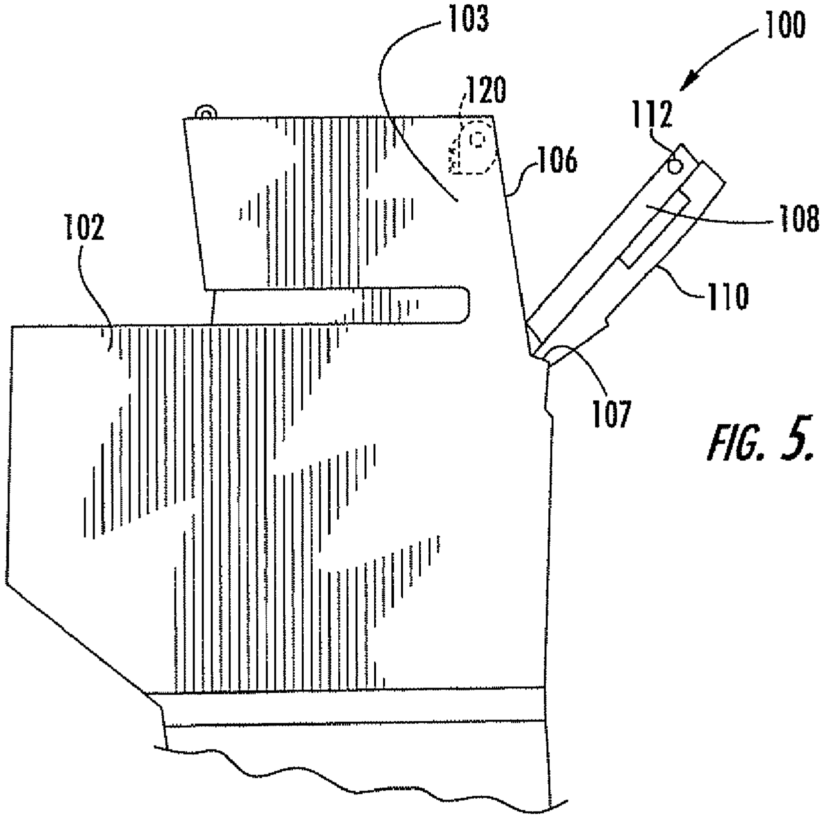
FIG. 5 is a side view of the dispensing bin of FIG. 4 illustrating the door in the open position.
Figure 6:
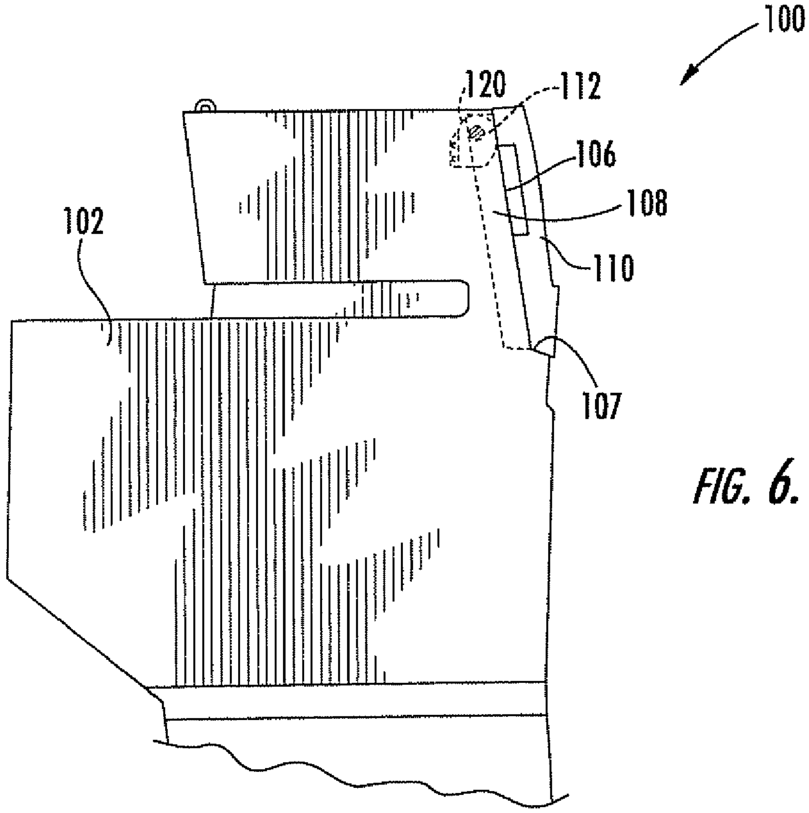
FIG. 6 is a side view of the dispensing bin of FIG. 4 illustrating the locking assembly engaging the door in the closed position.

Referring now to FIGS. 5 and 6, the structure of the dispenser 100 is illustrated in some detail therein. As noted, the dispenser 100 is typically used as part of a series of dispensers in the tablet dispensing station 62 (see FIG. 2), and the dispenser 100 is typically of the appropriate size and configuration to dispense pharmaceutical tablets. The dispenser 100 includes a bin 102 that can store objects, the door 110, a locking assembly 120, and a data storage unit that is part of and/or operatively connected with the controller 42. The bin 102 includes an access opening 106.

The door 110 is positioned adjacent to the access opening 106, and a hinge 107 connects the door 110 to the bin 102. The door 110 include sidewalls 108 that fit within walls 103 of the dispenser 100.

Figure 7A:
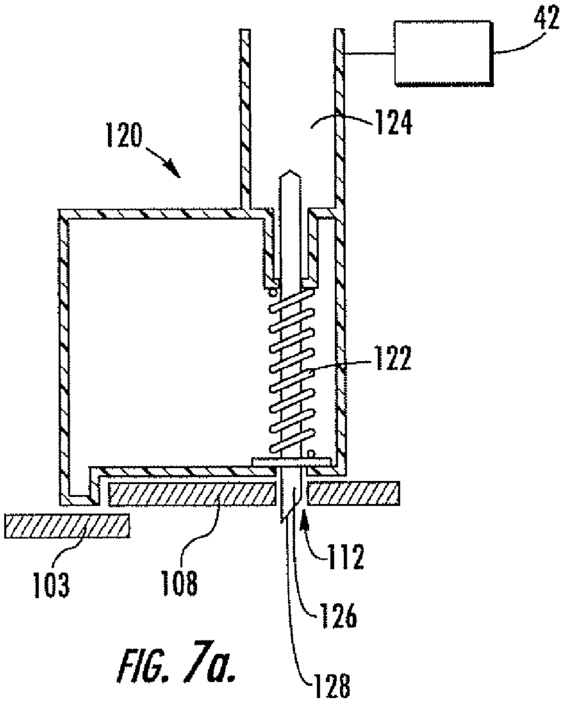
FIG. 7*a* is a cutaway top view of the dispensing bin of FIG. 4 illustrating the locking assembly engaging the door in the closed position with the extendable member in the extended position.
Figure 7B:
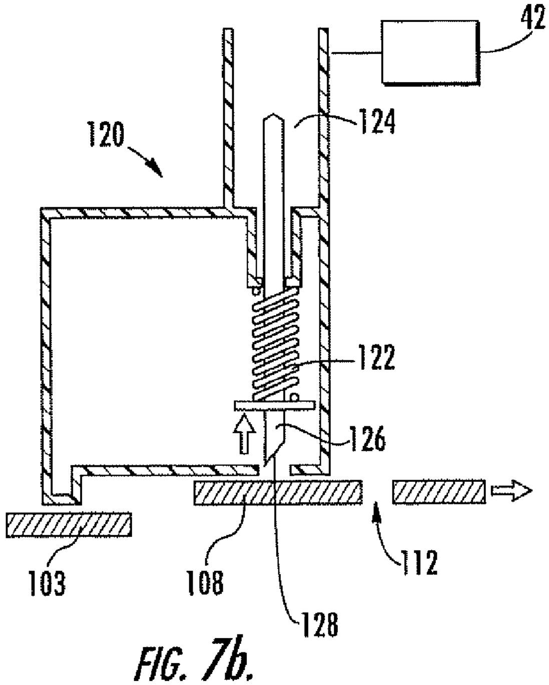
FIG. 7*b* is a cutaway top view of the dispensing bin of FIG. 4 illustrating the locking assembly with the extendable member in the retracted position and the door in the open position.

Referring now to FIGS. 7*a* and 7*b*, the locking assembly 120 is illustrated in some detail therein. In this embodiment, the locking assembly 120 includes an actuating member 124, an extendable member 126, and a spring 122 or other biasing member. The actuating member 124 (in this instance a solenoid) is mounted to the bin 102 and is operatively connected with the controller 42. The extendable member 126 extends from an aperture in the actuating member 124 and across the bin 102. In place, the extendable member 126 is movable relative to the actuating member 124 between extended and retracted positions; the spring 122 biases the extendable member 126 toward the extended position. In the extended position of FIG. 7*a*, the extendable member 126 is received within an aperture 112 in one of the sidewalls 108 of the door 110, and in the retracted position of FIG. 7*b*, the extendable member 126 retracts into the actuating member 124 and away from the sidewall of the door 110. In some embodiments, the extendable member 126 includes a chamfered end 128 to facilitate closing of the door 110.

Figure 8:
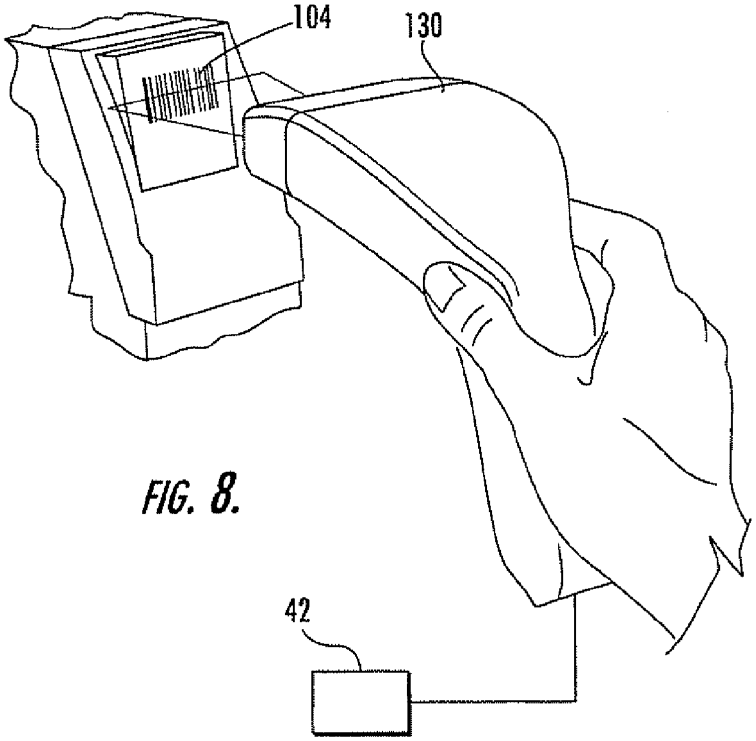
FIG. 8 is a perspective view of a scanning device and an identifier according to the present invention.
Figure 9:
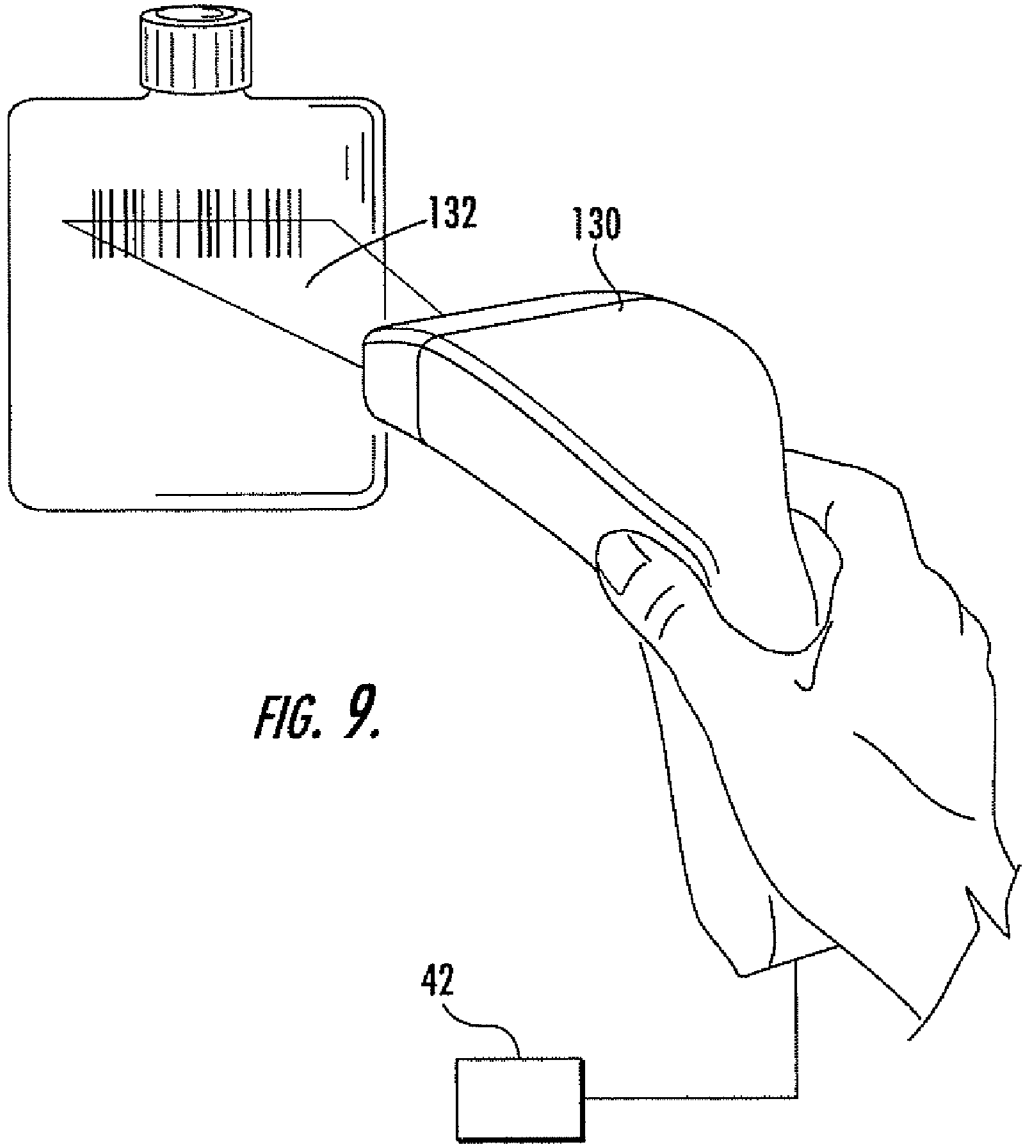
FIG. 9 is a perspective view of a scanning device and a second identifier according to the present invention.

Referring now to FIGS. 8 and 9, the bin 102 also includes an identifier 104, such as a bar code or RF tag, that identifies contents of the bin 102. The system 40 includes a scanner 130 or other reading device that can scan the identifier 104. The scanning device 130 is operatively connected with the controller 42.

Figure 13:
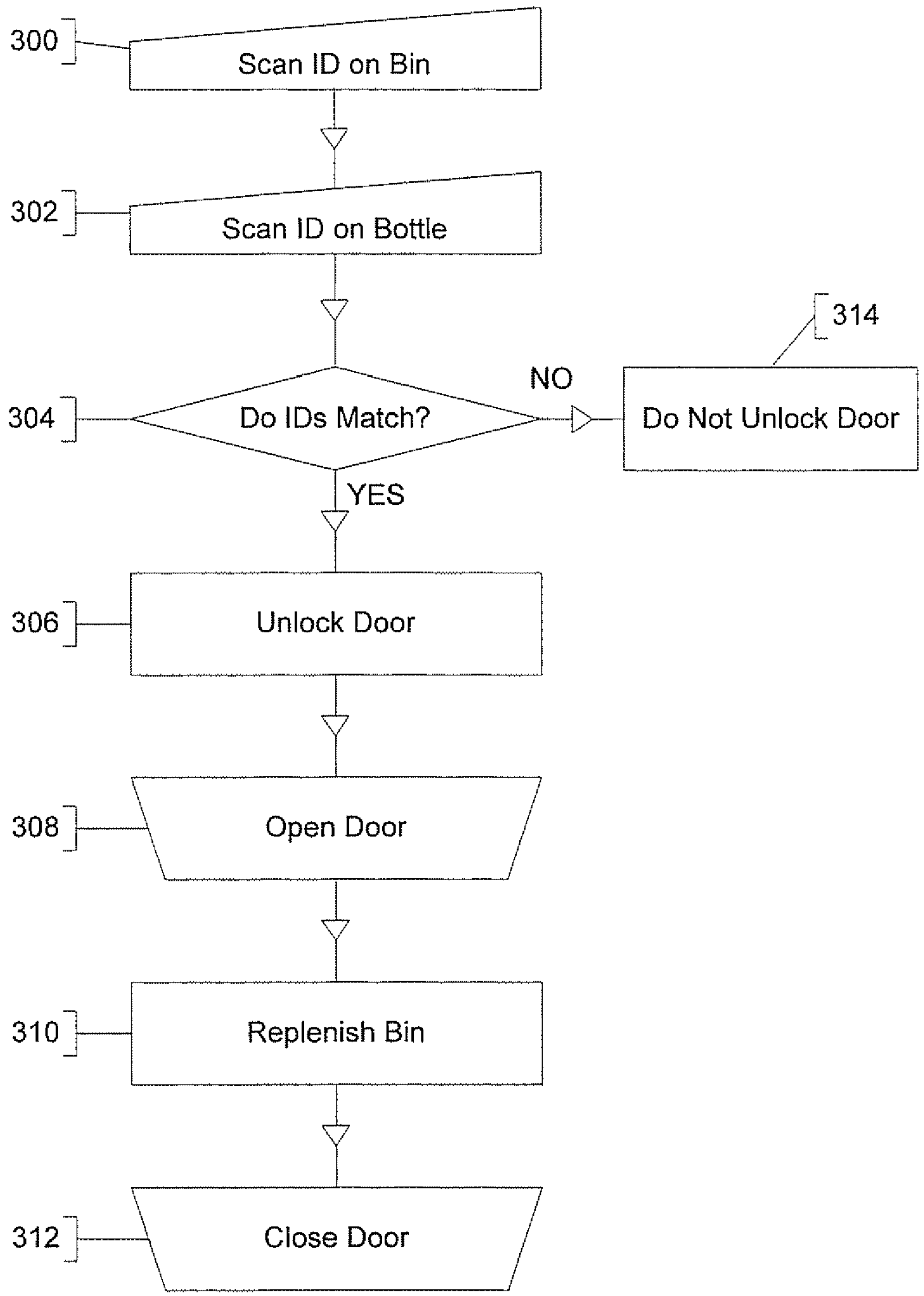
FIG. 13 is a flow chart illustrating operations of the dispensing bin of FIG. 4 according to embodiments of the present invention.

With reference to FIGS. 8, 9 and 13, prior to filling the dispenser 100 with objects, the door 110 may be unlocked as follows. First, the scanner 130 scans the identifier 104 that identifies the contents of the bin 102 (see FIG. 8 and Box 300 of FIG. 13). Then, the scanner device 130 scans an identifier 132 on a refill bottle or the like (which contains potential contents of the bin 102) that identifies the contents of the refill bottle (see FIG. 9 and Box 302). The controller 42 compares the identities of the contents and the potential contents (i.e., the contents of the bottle) of the bin 102 (Box 304). If the controller 42 determines that the identifiers do not match, the door is not opened (Box 314). If the controller 42 confirms a positive comparison between the identifiers 104 and 132, the controller 42 sends a signal to energize the actuating member 124. The extendable member 126 then retracts from the aperture 112, thereby unlocking the door 110 (Box 306) and permitting it to be opened via rotation about the hinge 107 (Box 308). In an open position, the door 110 provides access to the bin 102 for replenishing (Box 310). The door 110 can then be closed after replenishing (Box 312).

Figure 14:
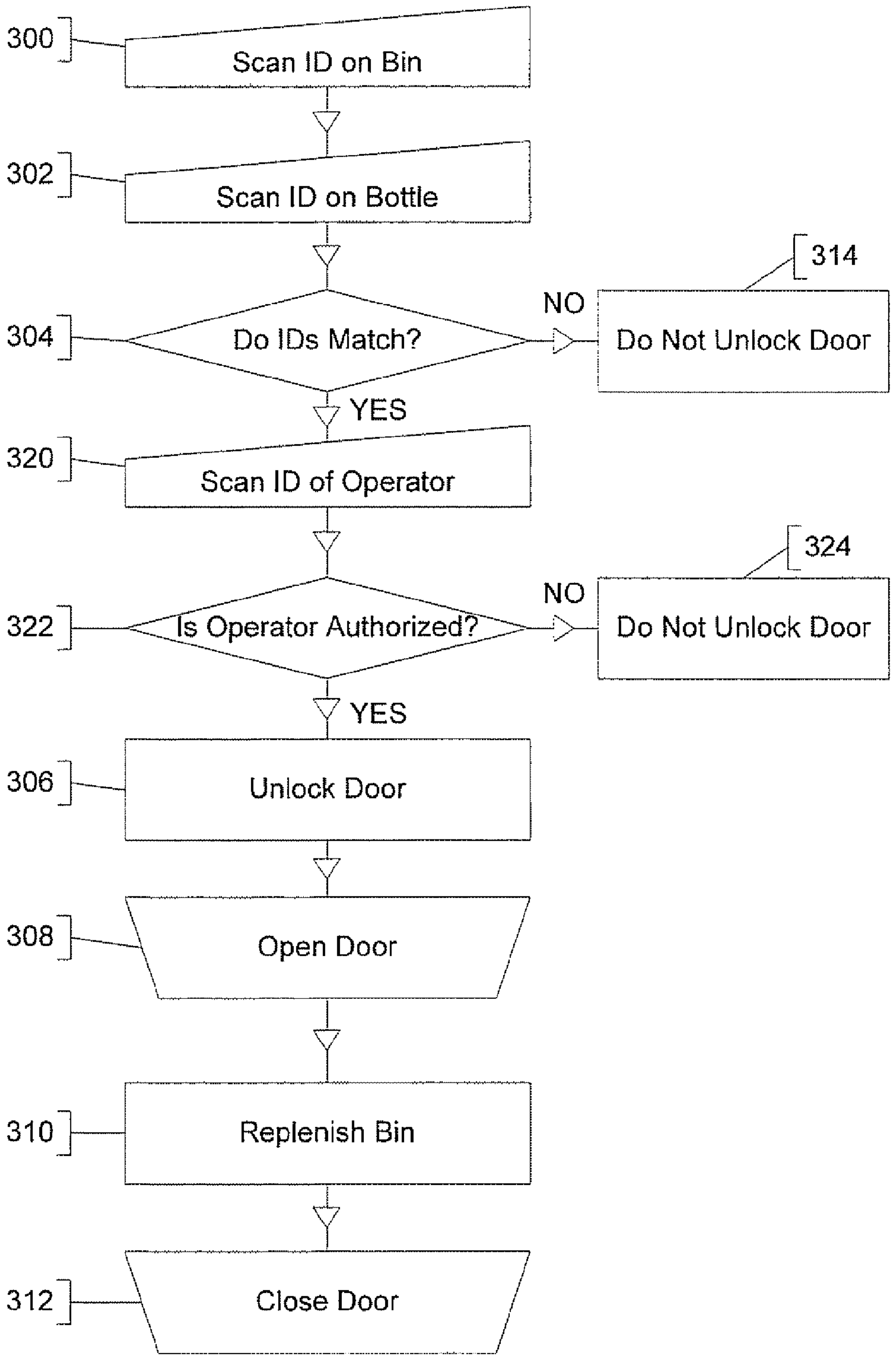
FIG. 14 is a flow chart illustrating operations of the dispensing bin of FIG. 4 according to additional embodiments of the present invention.

Different pharmacy personnel may have different levels of permission or authority to perform the various operations and activities in a pharmacy. For example, some workers may have access to all medications within the dispensing system, while others may be prohibited from accessing controlled substances or narcotics due to a lack of training and/or experience, To address this disparity in permission/authority between pharmacy workers, in some embodiments (see FIG. 14), unlocking of the door 110 may also include the step of the operator scanning a third identifier, the worker's identification badge (Box 320). A determination is made as to whether the operator is authorized to replenish that bin (box 322): if the operator is not authorized, the door does not unlock (Box 324). This step can ensure that the operator has authorization to access and replenish the bin 102.

It may also be desirable to store certain aspects of the replenishment operation in the controller to enable the creation of a replenishment log. For example, it may be useful to track the identity of the operator who replenished the bin and/or the time of replenishment, particularly if the incorrect pharmaceutical was found in the bin. It may also be useful for inventory purposes to have a log of replenishment for each bin. It may also be desirable to produce a log of improper attempts to replenish a cell. Other aspects of error management may also be recorded in the log.

Other embodiments can also be envisioned. For example, the locking assembly 120 can attach to the door 110 rather than the bin 102, and the extendable member 126 can extend into an aperture in the bin 102 rather than an aperture in the door 110. Another actuating device, such as a rotating screw-type component or other mechanical device, may be used to retract the extendable member. Additionally, a portion of the controller 42 can be mounted on the door 110 rather than on the bin 102, or can be mounted elsewhere in the system 40.

Further, those skilled in the art will appreciate that the door 110 can take other forms. For example, a spring or sliding device, rather than the hinge 107, can connect the door 110 to the bin 102. Also, the door 110 can be completely detached from the bin 102 and simply rest in the access opening 106 when the bin 102 is closed.

Figure 10:
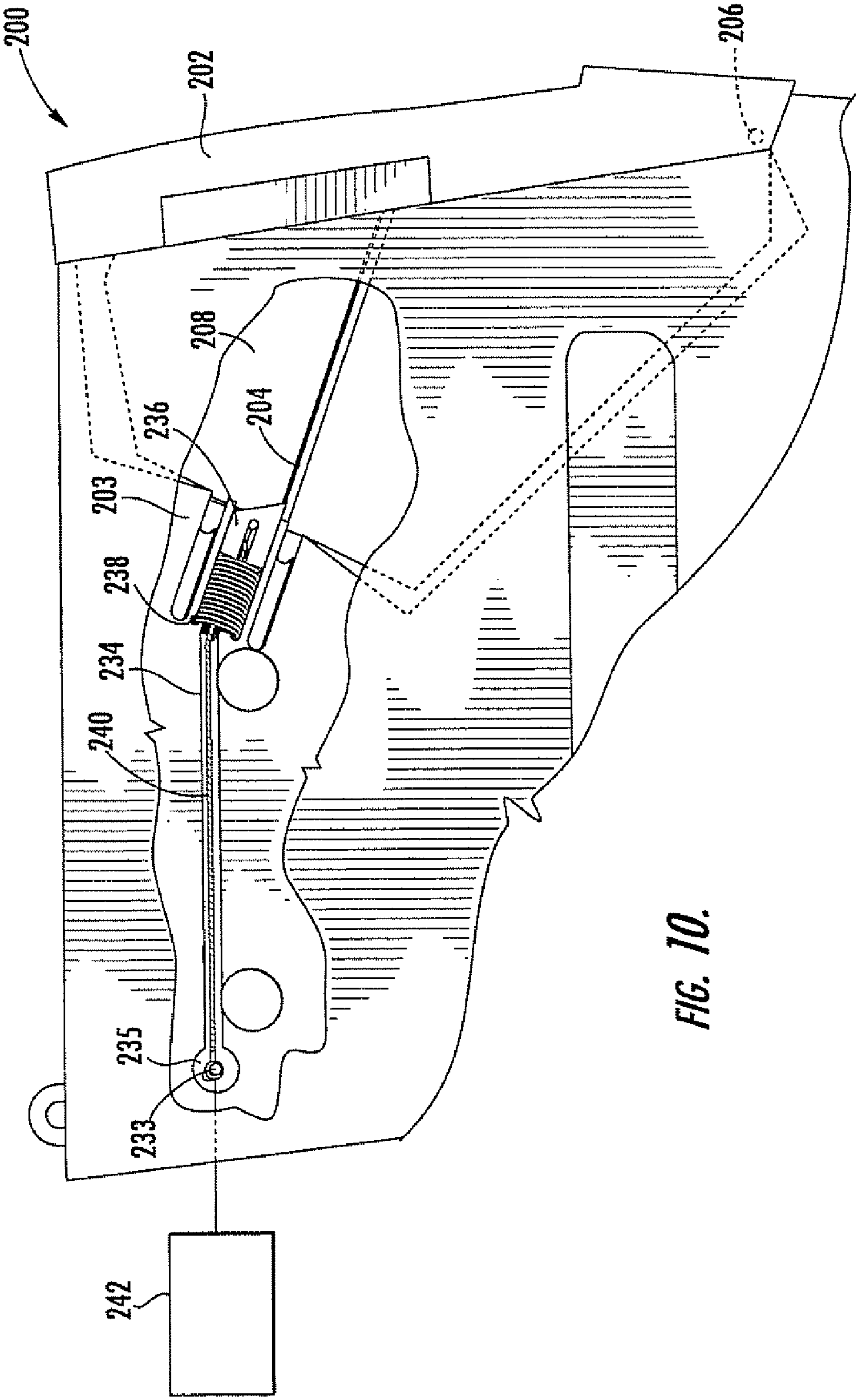
FIG. 10 is a side view of a dispensing bin with a locking door according to alternative embodiments of the present invention, with the door in its closed position.
Figure 11:
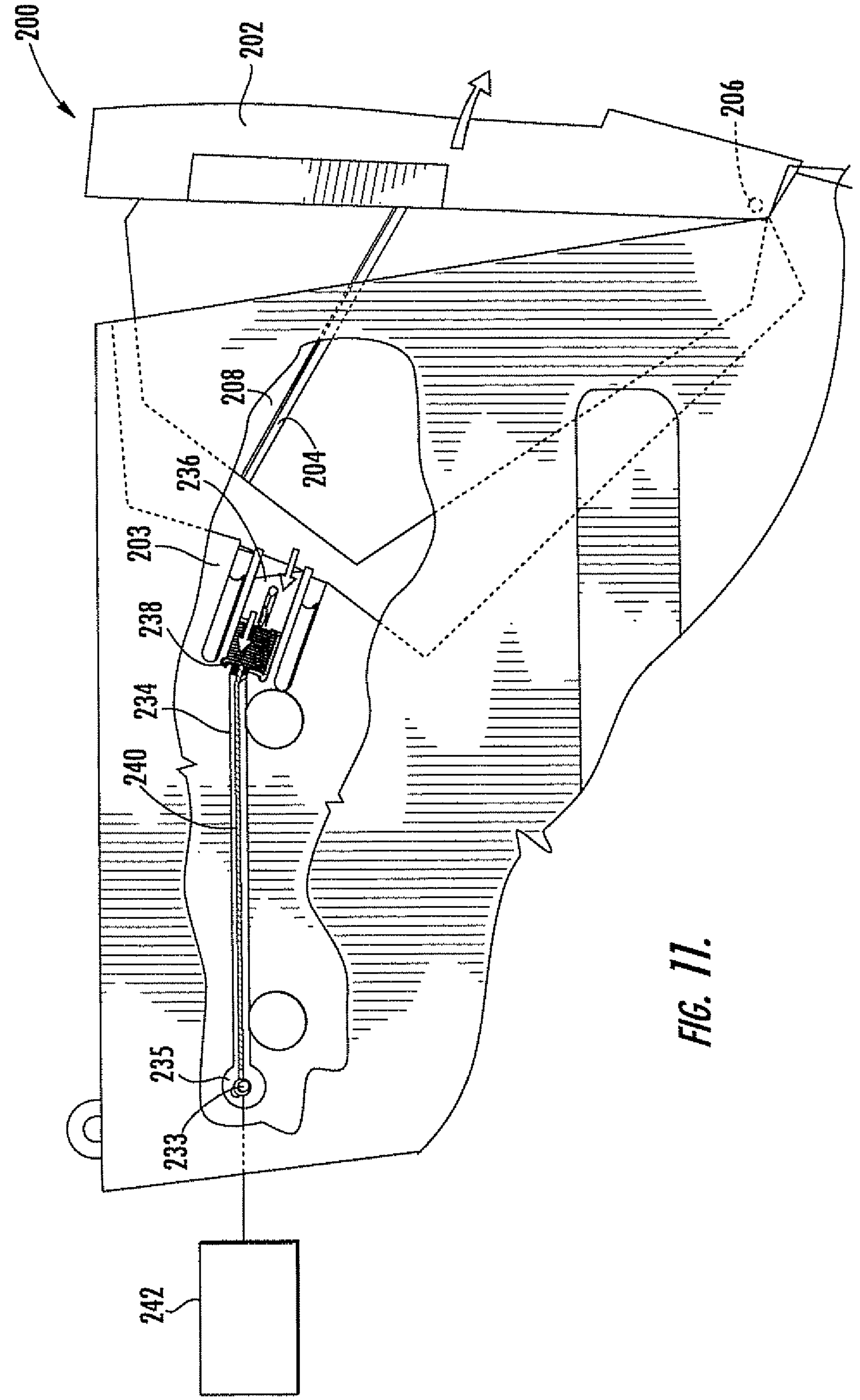
FIG. 11 is a side view of the dispensing bin of FIG. 10, with the door in an open position.
Figure 12:
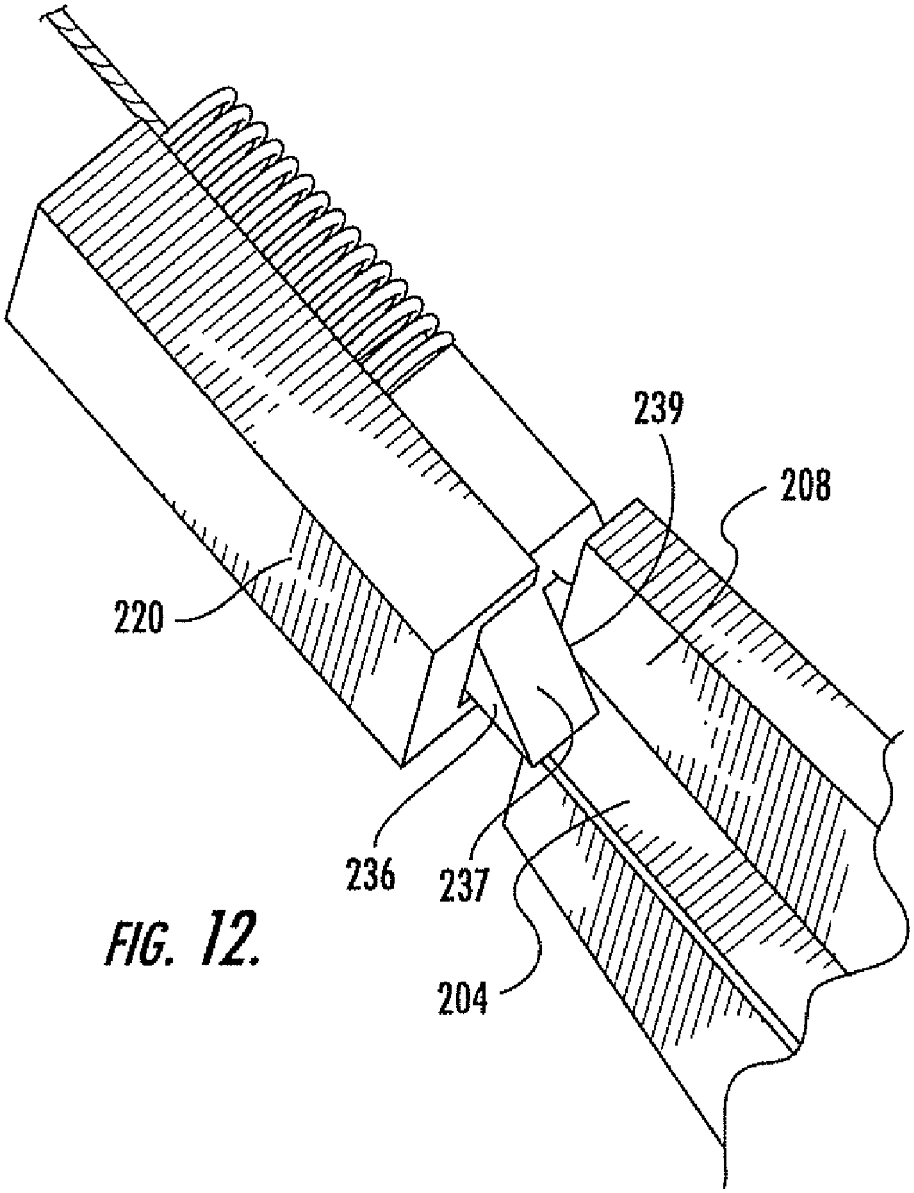
FIG. 12 is a greatly enlarged top perspective view of the latch member and door flange of the dispensing bin of FIG. 10 with the extendable member in the extended position.

Those skilled in the art will appreciate that the dispenser 100 can take other forms. An additional embodiment of a locking bin, designated broadly at 200, is illustrated in FIGS. 10-12. The bin 200 includes a door 202 that has sidewalls 208, 209; the door 202 is mounted to the sidewalls 203 of the bin 200 at a pivot 206 much like the door 110 described above. However, the door 202 includes a flange 204 that is generally horizontal and extends inwardly away from the side wall 208. On its outside surface, the door 202 includes a bar code (not visible in FIGS. 10-12) or other indicia that indicates the contents of the bin 200.

Figure 10A:
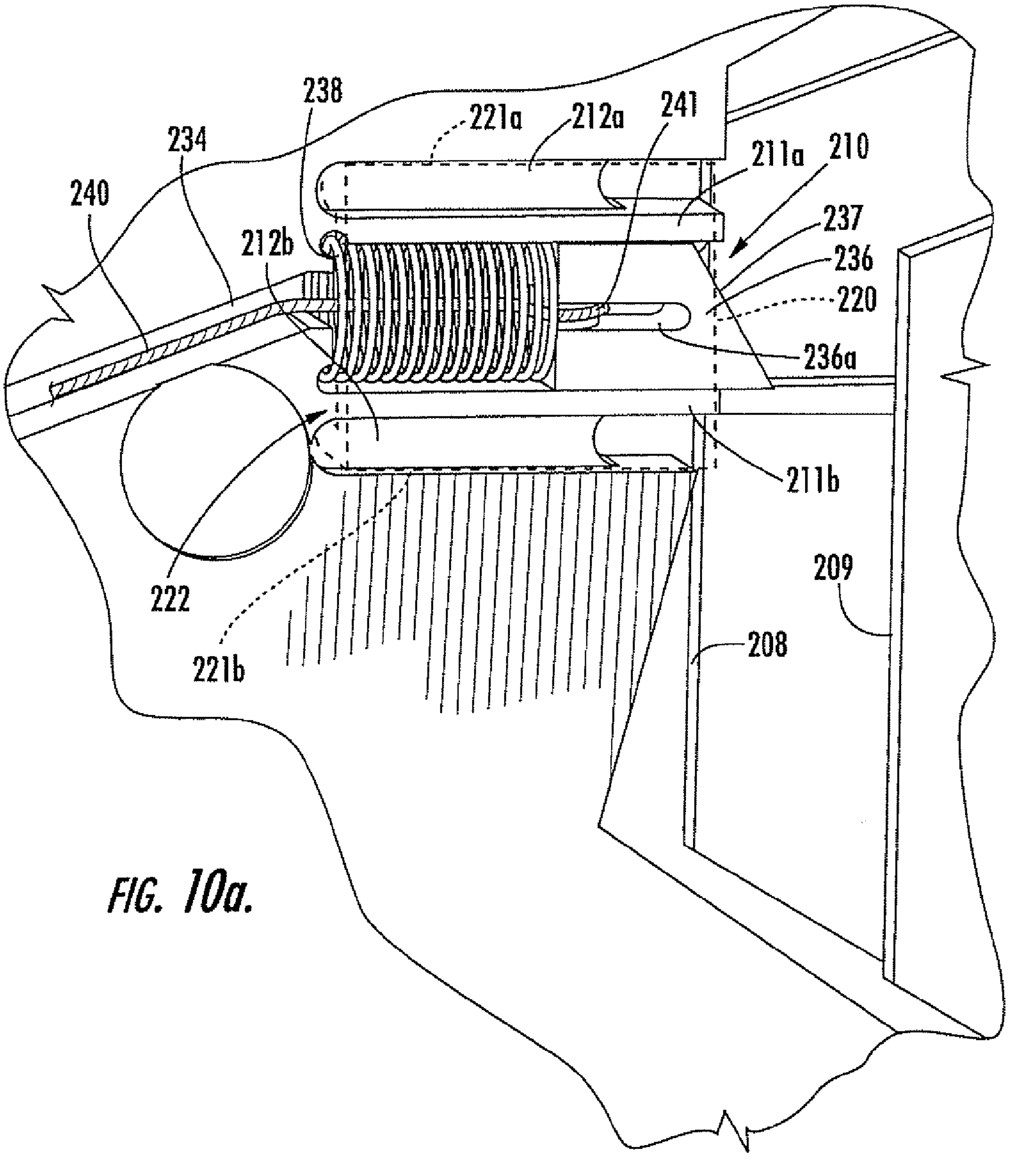
FIG. 10*a* is an enlarged perspective view of the door and locking system of FIG. 10.

Turning now to FIG. 10*a*, the side wall 203 includes a recess 210 adjacent the edge of the closed door 202 that is bounded by panels 211*a*, 211*b*. Slots 212*a*, 212*b* are located immediately adjacent and parallel to the panels 211*a*, 211*b*. A cover 220 has walls 221*a*, 221*b* that are received in respective slots 212*a*, 212*b*.

A latch member 236 resides within the pocket 222. The latch member 236 is generally wedge-shaped, with an inclined front face 237 that includes a cutaway area 239 (see FIG. 12) that receives the rear edge of the door wall 208. A spring 238 abuts one end of the latch member 236 and rests against the rear surface of the pocket 222.

Referring back to FIG. 10, an elongated slot 234 merges with the pocket 222 and extends rearwardly therefrom. At one end, the slot 234 has an enlargement 235 in which a pin 233 is located.

A length of wire 240 formed of a shape memory alloy, also known as "muscle wire," is located within the slot 234. The wire 240 is "doubled over" itself such that both ends are fixed to the pin 233 and the center of the wire 240 forms a loop 241 that fits within a slit 236*a* in the latch member 236 (see FIG. 10*a*). The "doubled" configuration enables the wire 240 to provide double the force of a single length of wire and provides a simple interconnection technique between the wire 240 and the latch member 236.

The shape memory alloy of the wire 240 is a material that has the characteristic property of shrinking upon heating. Exemplary materials include those sold under the trade names NITINOL and FLEXINOL (available from Dynalloy, Inc., Costa Mesa, Calif.), which are alloys of nickel and titanium. These materials are described further at www.nitinol.info and www.dynalloy.com and in U.S. Pat. No. 6,851,260 to Morton, U.S. Pat. No. 6,321,656 to Johnson, U.S. Pat. No. 6,293,020 to Julian, and U.S. Pat. No. 5,312,152 to Woebkenberg et al., the disclosure of each of which is hereby incorporated herein by reference. The ends of the wire 240 are connected electrically to a voltage source 242, which is in turn connected to the controller 42.

In the closed position shown in FIGS. 10, 10*a* and 12, the latch member 236 is extended such that its front end rests atop the rear end of the flange 204 of the door 202, which prevents the door 202 from opening. The latch member 236 is biased toward this extended position by the spring 238, which is in compression. The wire 240 has its normal tensioned length.

Figure 11A:
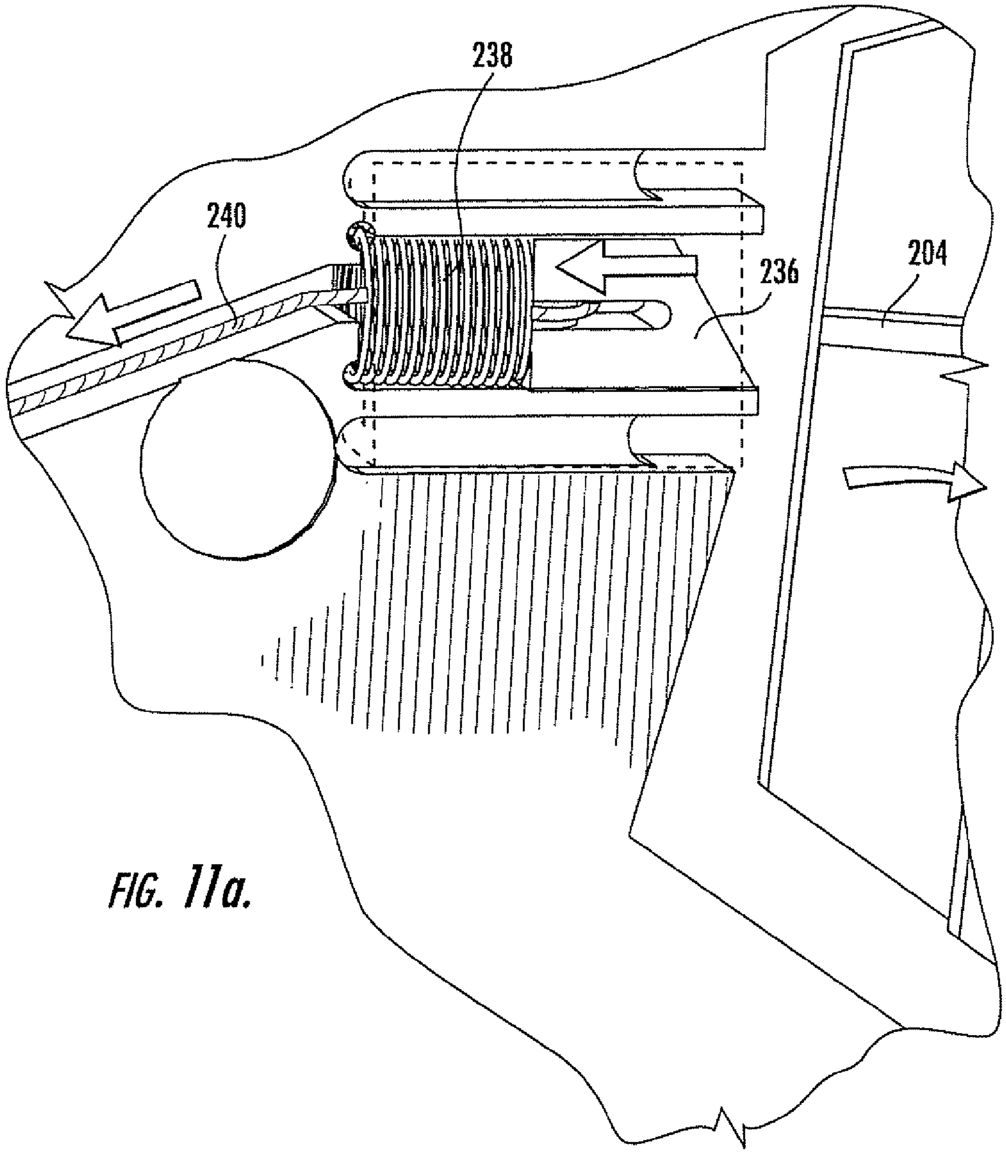
FIG. 11*a* is an enlarged perspective view of the dispensing bin of FIG. 11 with the door in an open position.

In operation, an operator uses a reading device, such as the scanner 130, to read the bar code or other identifier on the door 202 or wall of the bin 200 that identifies the contents of the bin 200. The operator then uses the reading device to read the bar code or other identifier on a bottle of pills or other objects that identifies the contents of the bottle. The controller 42 compares the scans. If the scans match, the controller 42 signals and energizes the voltage source 242. When the voltage source 242 is energized, it provides current through the wire 240; resistance in the wire 240 causes the wire 240 to heat up and, because of the thermal properties of the muscle wire 240, to shrink. Shrinkage in the wire 240 draws the loop 241 in the wire 240 away from the door 202, which in turn draws the latch member 236 away from the door 202 and compresses the spring 238 further (see FIGS. 11 and 11*a*). When the forward end of the latch member 236 has moved sufficiently away from the door 202 that it "clears" the flange 204, the door 202 is free to rotate about the pivot 206 to open (this rotation is clockwise from the vantage point of FIG. 11). Once the door 202 is open, or after a set time for the door 202 to be opened, the controller 42 deactivates the voltage source 242, which allows for the spring 238 to extend the wire 240 to return to its normal tensioned length.

After the bin 200 is replenished with pills, the operator then rotates the door 202 about the pivot 206 (counterclockwise from the vantage point of FIG. 11). When the edge of the flange 204 contacts the inclined front face 237 of the latch member 236, it forces the latch member 236 away from the door 202, compressing the spring 238. Once the front edge of the latch member 236 has "cleared" the edge of the flange 204, the door 202 is free to move into its closed position and the latch member 236 is returned to the extended position by the spring 238.

Those skilled in this art will appreciate that the bin 200 may take different configurations. For example, a single length of the wire 240 may be employed (i.e., the wire is not "doubled over"), or more than two lengths may be employed. The wire 240 may be attached to the latch member 236 in a different manner. The latch member 236 may lack a cutaway area 239, or the front face 237 may not be inclined. Other alternative configurations will also be evident to those skilled in this art.

In addition, an assembly comprising the wire 240, the latch member 236, and a protective cover such as the cover 220 may be provided as a separate self-contained module. Such a module may be optionally included in a bin, as desired, or retrofitted into an existing bin. The cover 220 can function to protect pills from the assembly (so that they will not be scratched, chipped, broken, etc., by the assembly) and to protect the assembly from pill dust or jamming due to pills, as well as hold the assembly in place. In addition, the cover 220 may protect the pills from heat generated by the wire 240, which might melt the pills.

Those skilled in the art will appreciate that the controller 42 can operate in different ways. For example, the scanner 130 can first scan the identifier on the bulk container, then the identifier corresponding to the contents of the bin (and the identity of the operator in a system with such capability), and compare the identities of the potential contents and the contents of the bin. Other methods of comparing the information on barcodes or other indicia of contents may also be employed by the controller 42.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An automated pharmaceutical dispensing machine, the machine comprising a plurality of dispensers for dispensing prescription pharmaceuticals contained therein, each of the dispensers configured to automatically fill pharmaceutical prescriptions and comprising:

a bin including an access opening;

a door adjacent to the opening and movable between open and closed positions to allow access for filling the bin through the opening;

one of the bin and the door including a first identifier corresponding to the identity of units of a single prescription pharmaceutical contained in the bin;

a locking assembly configured and positioned to engage the door in the closed position and prevent the door from moving to the open position;

an identifier reading device operably associated with the locking assembly to scan the first identifier and a second identifier on a bulk container, the second identifier corresponding to the identity of the contents of the bulk container; and a controller having a data storage unit and configured to receive and compare signals from the identifier reading device corresponding to the first and second identifiers;

wherein the controller is operably associated with the locking assembly such that the locking assembly disengages from the door responsive to a positive comparison by the controller, thereby enabling the door to be moved to the open position.

2. The automated pharmaceutical dispensing machine defined in claim 1, wherein the locking assembly is attached to the bin.

3. The automated pharmaceutical dispensing machine defined in claim 2, wherein the door has an aperture for receiving an extendable member of the locking assembly.

4. The automated pharmaceutical dispensing machine defined in claim 3, wherein the locking assembly further comprises an actuating member;

wherein the extendable member extends through the actuating member;

wherein the extendable member is movable between extended and retracted positions;

wherein in the extended position the extendable member extends into the aperture of the door to lock the door; and wherein the extendable member moves to the retracted position when the actuating member is actuated in response to a positive comparison by the controller.

5. The automated pharmaceutical dispensing machine defined in claim 4, wherein the extendable member includes an inclined face.

6. The automated pharmaceutical dispensing machine defined in claim 4, wherein the extendable member is biased toward the extended position.

7. The automated pharmaceutical dispensing machine defined in claim 1, wherein the first and second identifiers are bar codes.

8. The automated pharmaceutical dispensing machine defined in claim 1, wherein a portion of the controller is mounted on the bin.

9. The automated pharmaceutical dispensing machine defined in claim 4, wherein the actuating member is a solenoid, and the extendable member retracts in response to magnetizing of the solenoid.

10. The automated pharmaceutical dispensing machine defined in claim 4, wherein the actuating member is a muscle wire that shrinks in response to a signal from the controller.

11. The automated pharmaceutical dispensing machine defined in claim 4, wherein the actuating member is positioned in a slot in a side wall of the bin.

12. The automated pharmaceutical dispensing machine defined in claim 11, wherein the actuating member is a muscle wire that shrinks in response to a signal from the controller.

13. A method for opening a bin containing units of a prescription pharmaceutical, the method comprising:

reading a first identifier that corresponds with an identity of the prescription pharmaceutical contained in the bin;

reading a second identifier that corresponds with an identity of a prescription pharmaceutical contained in a bulk container;

comparing the first and second identifiers to confirm a positive comparison therebetween; and unlocking a locked door to the bin to permit access to the bin responsive to the positive comparison, the door covering an opening; and replenishing the bin through the opening with the prescription pharmaceutical contained in the bulk container.

14. The method defined in claim 13, wherein unlocking a locked door to the bin further comprises unlocking a locking assembly that is attached to the bin.

15. The method defined in claim 13, wherein the locked door has engagement structure for engaging an extendable member of the locking assembly.

16. The method defined in claim 15, wherein the locking assembly further comprises an actuating member;

wherein the extendable member extends through and is movable between extended and retracted positions relative to the actuating member; and wherein the extendable member moves to the retracted position when the actuating member is actuated in response to a positive comparison.

17. The method defined in claim 16, wherein the extendable member includes an inclined face.

18. The method defined in claim 16, wherein the extendable member is biased toward the extended position.

19. The method defined in claim 13, wherein the contents of the bin are pharmaceutical tablets.

20. The method defined in claim 13, wherein the first and second identifiers are bar codes.

21. The method defined in claim 13, further comprising:

reading a third identifier that identifies an operator; and determining if the identified operator has authority to access the bin prior to unlocking the locked door.

22. An automated pharmaceutical dispensing machine, the machine comprising a plurality of dispensers for dispensing prescription pharmaceuticals contained therein, each of the dispensers configured to automatically fill pharmaceutical prescriptions and comprising:

a bin including an access opening;

a door covering the opening and movable between open and closed positions to allow access for filling the bin through the opening;

one of the bin and the door including a first identifier corresponding to the identity of units of a single prescription pharmaceutical contained in the bin;

a locking assembly configured and positioned to engage the door in the closed position and prevent the door from moving to the open position;

an identifier reading device operably associated with the locking assembly to scan the first identifier and a second identifier on a bulk container, the second identifier corresponding to the identity of the contents of the bulk container; and a controller having a data storage unit and configured to receive and compare signals from the identifier reading device corresponding to the first and second identifiers;

wherein the controller is operably associated with the locking assembly such that the locking assembly disengages from the door responsive to a positive comparison by the controller, thereby enabling the door to be moved to the open position.

* * * * *